United States Patent [19]

Newell

[11] 4,297,625
[45] Oct. 27, 1981

[54] APPARATUS FOR DIVIDING THE STEP ANGLE OF A STEPPING MOTOR

[75] Inventor: Harold R. Newell, South Newbury, N.H.

[73] Assignee: Mesur-Matic Electronics Corporation, Salem, Mass.

[21] Appl. No.: 28,618

[22] Filed: Apr. 9, 1979

[51] Int. Cl.³ .......................................... G05B 19/40
[52] U.S. Cl. ................................................... 318/696
[58] Field of Search .......................................... 318/696

[56] References Cited

U.S. PATENT DOCUMENTS

| | | | |
|---|---|---|---|
| 3,885,210 | 5/1975 | Burnett | 318/696 |
| 4,087,732 | 5/1978 | Pritchard | 318/696 |
| 4,091,316 | 5/1978 | Friedman | 318/696 |
| 4,100,471 | 7/1978 | Pritchard | 318/685 |
| 4,121,145 | 10/1978 | Talmadge | 318/696 |
| 4,140,955 | 2/1979 | Drabing | 318/696 |
| 4,145,644 | 3/1979 | Liu | 318/696 |
| 4,151,449 | 4/1979 | Takahashi | 318/696 |

Primary Examiner—J. V. Truhe
Assistant Examiner—Eugene S. Indyk

Attorney, Agent, or Firm—Pollock, Vande Sande & Priddy

[57] ABSTRACT

Apparatus for electronically dividing the primary step of a stepping motor to provide an increased number of steps per revolution of the motor. Integrated circuit counters operate in an incremental or decremental mode to sequentially access data words in a sine memory and a cosine memory. Digital-to-analog converters apply the digital data words of the sine and cosine memories to operate phase power transitors and to thereby generate corresponding amplitude changes in the controlled driving current of two associated active phase windings of the stepping motor. An incrementally increasing controlled current signal is applied to one activated phase winding and a corresponding incrementally decreasing controlled current signal is applied to the other of the activated phase windings to smoothly step the motor in angular increments corresponding to the increasing or decreasing amplitudes of current, as defined by the data words of the sine and cosine memories. A voltage boost circuit is employed to apply increased voltage to an active phase winding if increasing current is being applied to the winding.

1 Claim, 6 Drawing Figures

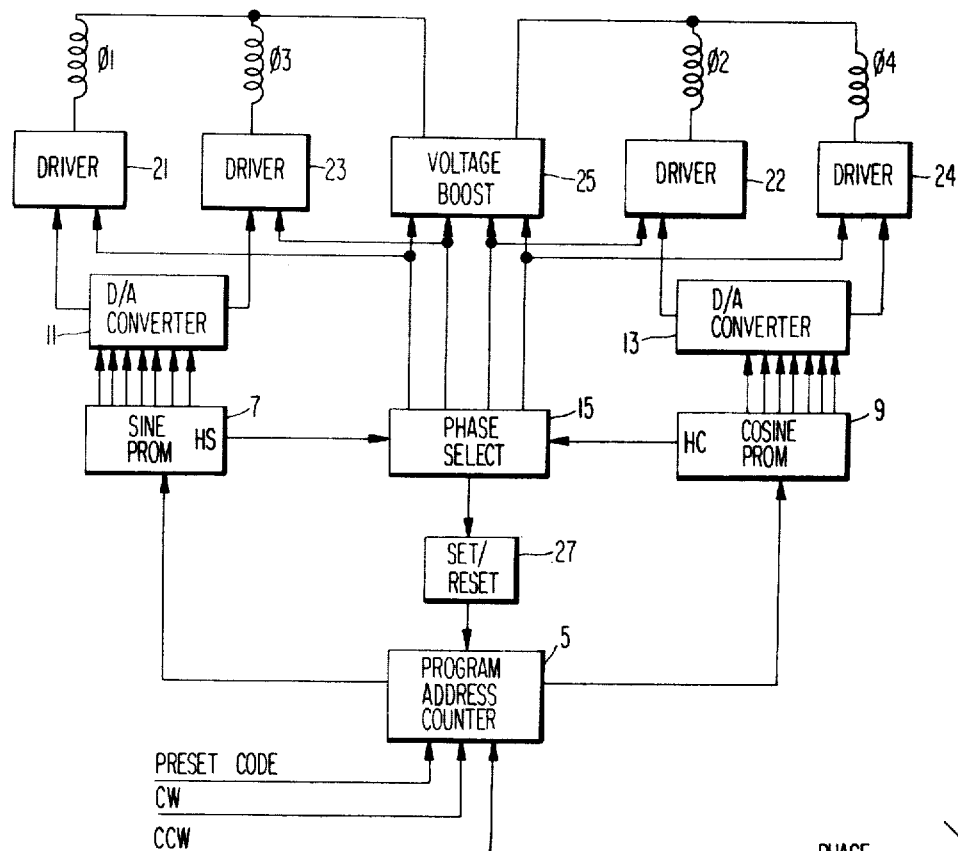
FIG 1
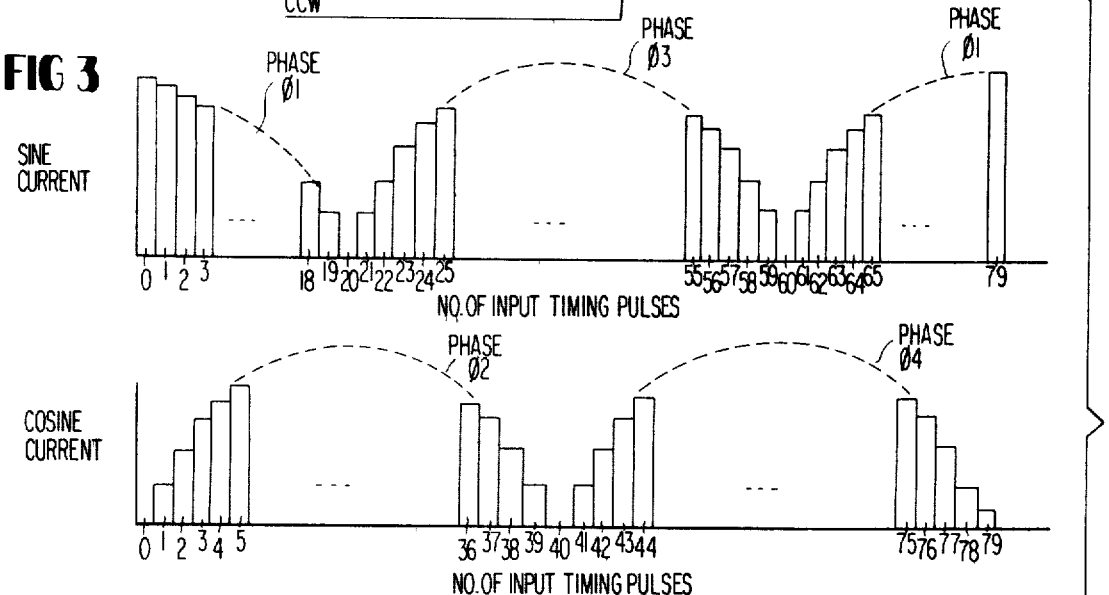
FIG 3
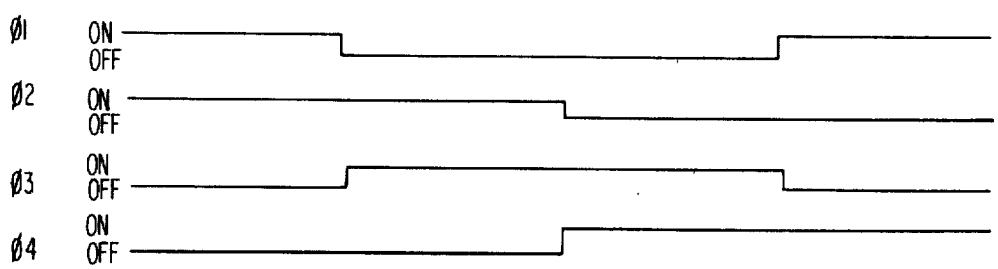

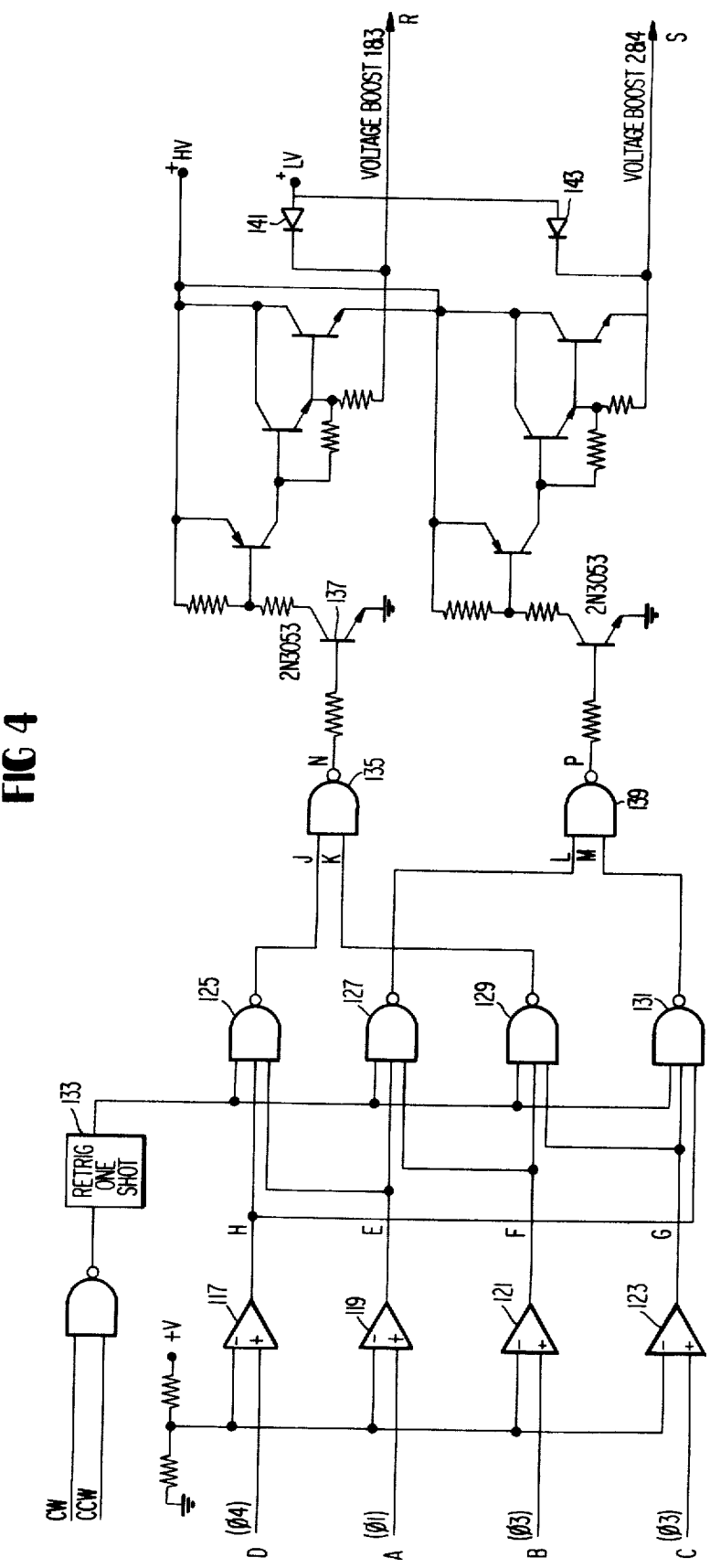

APPARATUS FOR DIVIDING THE STEP ANGLE OF A STEPPING MOTOR

BACKGROUND OF THE INVENTION

The invention relates to electrical means for dividing the primary step of a stepping motor to increase the number of motor steps per revolution of the rotor of the motor. More particularly, the invention relates to such a motor step divider including means for operating class A transistor phase drivers at a reduced voltage and momentarily boosting the operational voltage for a motor phase winding when increasing driving current is applied by a driver to the winding.

In the U.S. Pat. No. 3,444,447, entitled "Multi-Phase Step Motor Control Circuits Including Means for Supplementing the Normal Energization of the Windings", there is disclosed a multi-phase driver circuit for energizing the phase windings of a stepping motor according to a switching logic program so that each phase winding is energized for a certain period and is thereafter de-energized for a certain period.

However, in such a prior art control circuit, the phases of the motor are operated either fully on or fully off, thus providing a fixed prime step for the motor. If a greater resolution for a particular stepping motor is required, it has not heretofore been possible to easily modify or otherwise control the motor to increase the number of motor steps per revolution.

Accordingly, it is an object of this invention to provide a step divider means for adjustably dividing the prime step of a stepping motor into smaller steps to achieve a greater stepping resolution.

A further object of this invention is to provide such a step divider means that will operate to apply incrementally increasing and decreasing driving current to adjacent motor phase windings to servo the rotor smoothly between adjacent motor phase positions.

Another object of the invention is to provide an apparatus for dividing the prime step of a stepping motor by a factor that may be altered by changing a wired counter preset plug and associated sine and cosine programmable read-only memories.

In the U.S. Pat. No. 3,662,245 entitled, "Controlled Circuit for Energizing the Windings of Multi-Phase Step Motors Including a Two-Level Supply Voltage", there is disclosed a control circuit for reducing the power dissipation of the phase drivers of a step motor by operating the drivers at a reduced voltage and applying a voltage boost signal to a phase winding of the motor when driving current is applied to the winding. However, such a prior art voltage boost circuit has been employed to provide a voltage boost over the entire period of energization of a phase winding and, therefore, is not appropriate for efficient operation when an incrementally increasing or decreasing phase current is employed to energize the phase windings of a motor.

Accordingly, it is a further object of the invention to provide a voltage boost means for applying an increased voltage signal to a phase winding of a stepping motor when incrementally increasing driving current is applied to the winding.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the prime step divider for a four-phase stepping motor, according to the invention, includes means for applying an incrementally increasing controlled current signal to one phase winding of the motor while simultaneously applying an incrementally decreasing controlled current signal to an adjacent phase winding of the motor. Overlapping controlled current signals, for example sine and cosine signals, are employed to smoothly step the motor.

The sine and cosine current signals are defined with respect to input timing pulses, each input timing pulse defining a particular associated amplitude of current for a sine and a corresponding cosine current waveform. More particularly, each of the input timing pulses is applied to either increment or decrement a program address counter, depending upon whether the counter is operated in an incrementing or decrementing mode. The program address counter accesses data words in a sine programmable read-only memory (PROM) and a cosine PROM and the data words are applied to define particular amplitudes of controlled driving current for two activated, adjacent phase windings of the motor.

Seven bits of data from both the sine and cosine PROM are applied to digital-to-analog converters to generate corresponding analog voltages. The analog voltages are applied to operate phase-driving transistors and to thereby generate a corresponding amplitude of driving current in each of the two active phases of the four-phase stepping motor. A sine data word and corresponding cosine data word define a single angular step for the motor.

The program address counter is incremented through a stepping cycle to define an increasing and a corresponding decreasing driving current signal for each of the phase windings of the stepping motor. After a single stepping cycle has been completed, the counter is reset to begin the counting sequence for the next cycle.

High order bits of the sine and cosine PROMs are utilized to define the active phases for any particular sine or cosine data word.

A voltage boost circuit is employed to apply increased voltage to an active phase during the interval that the phase receives incrementally increasing driving current.

BRIEF DESCRIPTION OF THE DRAWINGS

FIG. 1 shows a block diagram of a prime step divider according to the invention.

FIG. 3 shows a plot of the sine and cosine current signals that are applied to the phase windings of the stepping motor of FIG. 1.

FIG. 4 illustrates a circuit diagram of a voltage boost circuit for the prime step divider of FIG. 2.

DETAILED DESCRIPTION OF THE PREFERRED EMBODIMENT

Figure 2:
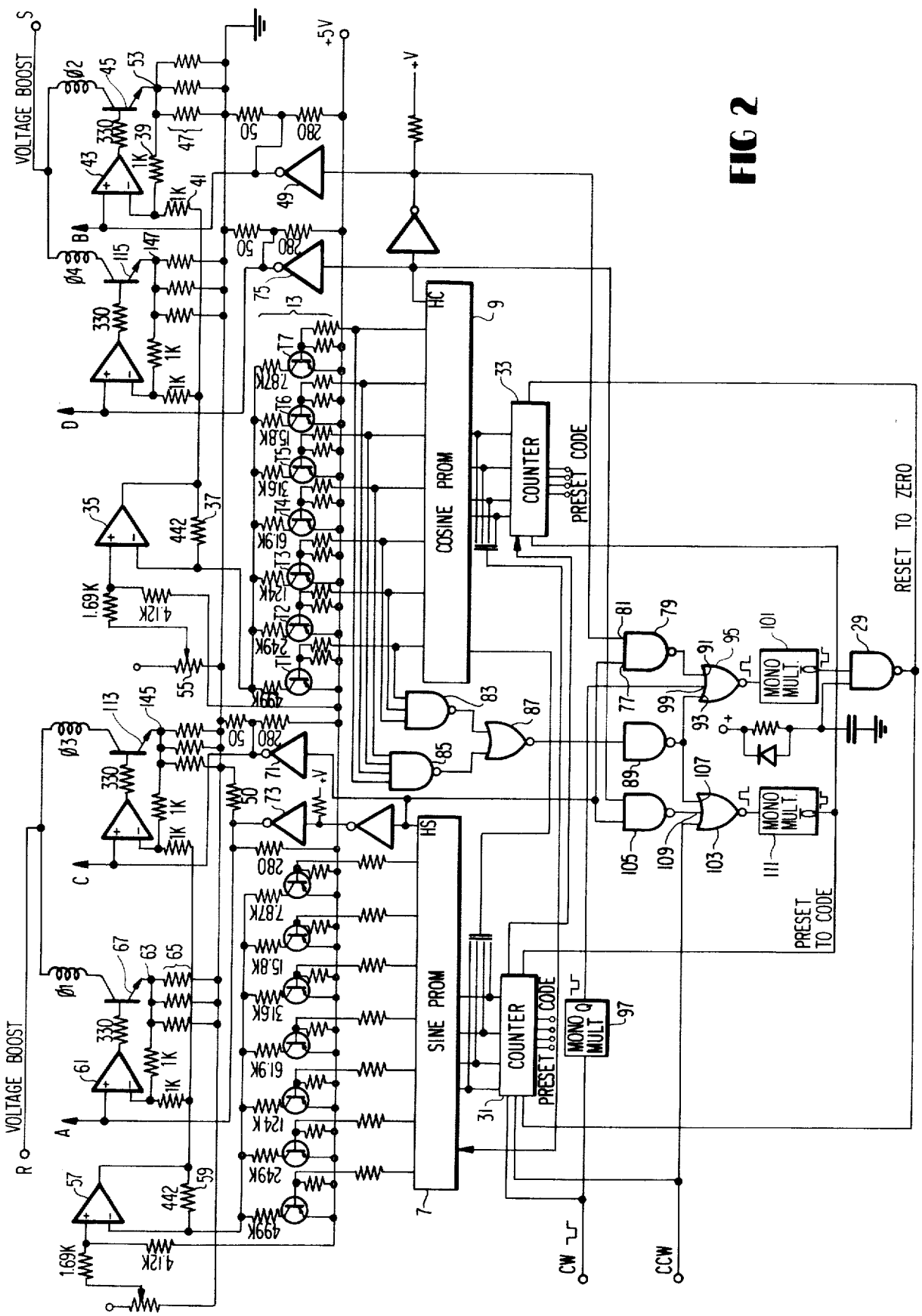
FIG. 2 shows a detailed circuit diagram of a preferred embodiment of the prime step divider of FIG. 1.

The remaining portion of the specification will describe preferred embodiments of the invention when read in conjunction with the attached drawings, in which like reference characters identify identical apparatus.

FIG. 1 shows a block diagram of an apparatus for electronically dividing the prime step of a permanent magnet or variable reluctance stepping motor to provide an increased number of steps per revolution of the rotor of the motor and to thereby provide a higher stepping resolution for the motor. The preferred embodiment of FIG. 1 illustrates a step divider apparatus that operates to divide the steps of a four-phase stepping motor. However, the invention may be more generally applied to divide the steps of a stepping motor having any number of phases.

It will be appreciated by those skilled in the art that a four-phase stepping motor typically includes a rotor that is caused to rotate in response to varying magnetic forces applied by four adjacent stator phase windings. The stepping motor also has machined teeth sufficient to define an angular step of 1.8° each time an energization pulse is applied to step the motor. Thus, such a motor will move 200 angular steps for each revolution of the rotor.

The step-dividing apparatus of FIG. 1 energizes motor phase windings $\phi 1$, $\phi 2$, $\phi 3$ and $\phi 4$ with controlled current signals that have an amplitude that varies as a function of the number of input timing pulses CW or CCW that are applied to a program address counter 5. In accordance with a preferred embodiment of the invention, the current signals trace a sine or cosine waveform when plotted against the number of input timing pulses that are applied over time.

The phase-windings of the motor are energized in pairs, with one winding of a pair receiving incrementally increasing current while the other winding receives corresponding incrementally decreasing current. Of course, a change in the amplitude of the driving current is defined for each input timing pulse that is applied. Thus, the rotor is smoothly "servoed" between the energized pair of phase windings to provide the corresponding smaller angular steps.

In operation, an incrementing input timing pulse CW is applied to increment a program address counter 5 from a preset, cleared state. Address data at the output of the program address counter 5 is applied to a programmable read-only memory (PROM) 7 having sine phase data and a second PROM memory 9 having corresponding cosine phase data. As the program address counter 5 is incremented by the input timing pulse CW, successive addresses in the sine PROM 7 and cosine PROM 9 are accessed and corresponding digital stepping data is generated.

The digital stepping data from the sine PROM 7 is applied to a sine digital-to-analog converter 11 and the corresponding data from the cosine PROM is applied to a corresponding cosine digital-to-analog converter 13. The digital-to-analog converters 11 and 13 are each operated to generate an analog voltage corresponding to the digital data input from the associated sine or cosine PROM. A high order bit HS from the sine PROM 7 and a high order bit HC from the cosine PROM 9 are applied to a phase select circuit 15 that generates corresponding control signals to activate a pair of phase drivers 21, 22, 23 and 24.

One driver of an activated phase driver pair receives analog control data from the sine digital-to-analog converter and the other driver receives similar data from the cosine digital-to-analog converter. The analog control signal for each driver determines the magnitude of controlled phase current that is applied by the activated driver to its associated phase winding.

The phase select circuit 15 also controls a voltage boost circuit 25 that operates to apply a voltage boost signal to a phase winding when increasing current is being applied to the winding. The voltage boost signal ensures that the voltage for a phase winding will be sufficiently high to allow a rapid rise in the current of the phase winding despite the inductance of the winding.

The phase drivers 21-24 are normally operated at decreased voltages to minimize power consumption and to reduce the undesirable heating that results from increased power dissipation. Thus, the drivers 21-24 apply an increasing or decreasing controlled current to the associated active phase windings and the voltage boost circuit 25 is employed to increase a phase voltage only when it is necessary to ensure that the desired constant current flows in the corresponding phase winding.

As the program address counter 5 is incremented, the sine and cosine PROMs 7 and 9 and the phase select circuit 15 operate to apply current of appropriate amplitude to the phase winding $\phi 1$-$\phi 4$ to step the motor. Each increment of the program address counter 5 causes the sine PROM 7 and the cosine PROM 9 to generate a data word corresponding to a particular amplitude of sine energization current and a particular amplitude of cosine energization current for two phases of the motor.

Thus, the program address counter and the sine and cosine PROMs define current signals that trace a sine or cosine waveform when plotted against the number of input timing pulses received by the program address counter over an operational cycle of the invention. It should be understood that an operational cycle for the apparatus of the invention corresponds to the number of input timing pulses required to successively energize the four phase windings of the motor with an increasing and corresponding decreasing portion of a sine or cosine current signal.

The smooth, incremental energization of the phase windings $\phi 1$-$\phi 4$ is continued by resetting the program address counter 5 after the counter has been incremented a sufficient number of times to define a positive sine signal for phase windings $\phi 1$ and $\phi 3$ and a corresponding overlapping positive cosine signal for phase windings $\phi 2$ and $\phi 4$. The program address counter 5 is reset by a set/reset circuit 27 that is operated by control signals from the phase select circuit 15.

The program address counter 5 may be operated in a decrementing or down-counting mode by first applying a preset data code to preset the program address counter to a particular count state and thereafter applying decrementing input timing pulses CCW to decrement the program address counter to a cleared state. If the program address counter 5 is operated in the decrementing state, the set/reset circuit 27 operates to set the program address counter to the particular preset code after each operational cycle is completed.

FIG. 3 illustrates a plot of the driving current that is applied to the phase windings $\phi 1$-$\phi 4$ of the motor over an operational cycle of the apparatus of the invention. As indicated in FIG. 3, the phase winding $\phi 1$ is initially activated and the data words of the sine PROM are sequentially accessed to provide a series of current signals of decreasing amplitude for $\phi 1$. Simultaneously, the cosine PROM is sequentially accessed to define a series of increasing current signals for the phase winding $\phi2$. The rotor of the stepping motor is caused to move an incremental angular distance for each input timing pulse that is applied to change the amplitude of the current for the windings $\phi1$ and $\phi2$.

As shown in FIG. 3, as the program counter 5 is incremented, successive phase winding pairs are activated and a corresponding increasing or decreasing driving current is applied to each member of the active phase pair. For example, as the driving current that is applied to $\phi1$ reaches a minimum at a pulse count of 20, the associated high order data bit HS for the sine PROM is applied to deactivate the phase winding $\phi1$ and to activate the phase winding $\phi3$, while the high order bit HC for the cosine PROM maintains the winding $\phi2$ in an activated state. Thus, increasing current is applied to the phase winding $\phi3$ under the control of the sine PROM and a corresponding decreasing current is applied to the phase winding $\phi2$ under the control of the cosine PROM.

It should be understood that each change in the amplitude of the cosine driving current of FIG. 3 corresponds to a particular 7-bit data word in the cosine PROM and the time interval for each current step is defined by the frequency of the input pulses CW or CCW that are applied to the program counter 5 that addresses the cosine PROM. Likewise, each of the associated sine current steps is defined by a 7-bit data word of the sine PROM and the sine data is accessed in the same manner as for the cosine PROM.

FIG. 2 illustrates a detailed circuit diagram of a step-divider circuit for a four-phase stepping motor. For the sake of clarity, the operation of the circuit of FIG. 2 will be described with respect to a stepping motor having a normal stepping operation of 200 steps per revolution or a 1.8° step angle. However, it should be appreciated that the circuit of the invention may be employed to divide the steps of stepping motors having different characteristic numbers of steps per revolution.

The operation of the circuit of FIG. 2 will be described for a step-divider wherein the number of steps per revolution of the stepping motor is increased by a factor of 20, thus providing 4,000 steps per revolution. As shown in FIG. 3, the program address counter 5 for the step divider must be operated to repeat a cycle of 80 program steps, corresponding to the 80 current steps that are required for the sine and for the cosine current signals of a cycle. Thus, if the program address counter 5 is operated in the incremental mode, 80 incrementing input timing pulses CW will be required to define the sine and cosine signals for the four phases of the stepping motor. Also, the sine and cosine PROMs must have sufficient capacity to store the 160 data words that are required to define the driving current cycle when the embodiment of FIG. 2 is operated to divide a prime motor step by 20.

As shown in FIG. 2, the program address counter 5 of the invention may be comprised of two interconnected up-down counters 31 and 33 such as are known by the commercial designation 74193. If the counters 31 and 33 are initially cleared, incrementing timing pulses CW may be applied to increment the counters and to generate corresponding incremented digital addressing signals that are applied to access stored 8-bit data words in the sine PROM 7 and the cosine PROM 9. For the embodiment of FIG. 2, the PROMs may each have a storage capacity of 256, 8 bit words, for example as provided in commercially available PROMs designated 745470. However, it should be appreciated that only 80 words in each PROM are required if the apparatus of FIG. 2 is operated to increase the number of steps by a factor of 20.

In operation, when power is first applied to the circuit of FIG. 2, one input of a NAND gate 29 is connected to the junction of a resistor and a capacitor to hold the associated input of the NAND gate 29 low while the capacitor charges. While the capacitor is charging, the low input on the NAND gate 29 forces the output of the gate to a high logic level. The high signal at the output of the NAND gate 29 is applied to the reset input of the up-down counters 31 and 33 to reset or clear the counters so that their output address bits are logic lows. When the capacitor has charged, the associated input of the NAND gate 29 is a logic high and the output of the gate 29 is forced low to release the reset line of the up-down counters 31 and 33.

After the up-down counters 31 and 33 are cleared, the low output signals of the counters are applied to the sine and cosine PROMs to access associated data words of the PROMs. Thus, for an initial pulse count of 0, the seven data bits of the first word of the cosine PROM are logic high signals. The high signals are applied to corresponding transistors T1–T7 of the transistor array of a binary weighted resistance digital-to-analog converter 13. Since the cosine data bits are high, the associated binary weighted resistances do not pull on the inverting input of a summing operational amplifier 35. Therefore, the output of the operational amplifier 35 assumes the same voltage as its non-inverting input, or 1.5 volts, due to the operation of a feedback resistor 37.

The output of the operational amplifier 35 is applied to two resistors 39 and 41 having a common junction that connects with an inverting input of a phase-drive operational amplifier 43. The output of the phase-drive amplifier 43 is applied to a phase-power transistor 45 that is connected to current-sensing resistors 47.

The non-inverting input of the operational amplifier 43 is driven by a corresponding open collector inverter 49. The inverter 49 generates a high output voltage of 0.75 volts DC to activate the phase winding $\phi2$ when the high-order bit HC to the cosine PROM is high. The inverter 49 generates a low or near-zero voltage signal to deactivate the phase winding $\phi2$ and to thereby reduce the flow of current in the phase winding $\phi2$ when the high-order bit HC of the cosine PROM is low.

A high 0.75 volt signal at the non-inverting input of the phase-drive operational amplifier 43 causes the phase-power transistor 45 to conduct in accordance with the applied voltage from the summing operational amplifier 35. Thus, the conducting phase-power transistor 45 causes a controlled current to flow to the phase-winding $\phi2$ and the magnitude of the controlled current corresponds to the 7-bit data word at the output of the cosine PROM 9.

The phase current that passes through the conducting phase-power transistor 45 is controlled for the initial pulse count of 0 when the operational amplifier 43 operates to force the voltage at its inputs to be equal. Thus, the output of the amplifier 43 forces a circuit node 53 to zero volts, so that the 1.5 volts at the output of the operational amplifier 35 is divided by the resistors 39 and 41 to provide 0.75 volts DC at the inverting input of the amplifier 43. A calibration potentiometer 55 may be operated to trim the 1.5 volts DC at the non-inverting input of the amplifier 35 to cause exactly zero volts to appear at the circuit node 53. It should be appreciated that in order for the above-described circuit to work properly, there must be a load in the collector of the phase-power transistor 45 that is connected to a source of positive voltage.

As shown in FIG. 3, for the initial pulse count 0, a maximum controlled current is applied to the phase-winding $\phi 1$. This maximum current is generated in response to logic lows at the 7-output bits of the sine PROM 7. The low sine PROM bits cause a maximum binary weighted current to flow to the inverting input of a summing operational amplifier 57.

The inverting input of the amplifier 57 is connected to 5 volts DC through an effective 3964.459 ohms of resistance. Thus, the voltage at the inverting input of the amplifier 57 remains substantially the same as the 1.5 volts DC voltage at the non-inverting input of the amplifier 57. Therefore, current flow may be calculated as: $(5-1.5)$; $3.5 \div 3964.459 = 0.8828$ ma.

The voltage across a feedback resistor 59 is, therefore, $0.8828 \times 442 \simeq 0.390$ volts DC, so that the voltage at the output of the operational amplifier 57 is a minimum of 1.11 volts DC. Since the voltage at the inverting input of a corresponding phase-drive operational amplifier 61 must be maintained at 0.75 volts DC, the voltage at an associated circuit node 63 rises to: $1.11 - 0.75 = 0.36$; $0.75 - 0.36 = 0.390$ volts DC.

When the voltage at the circuit node 63 and current sensing resistors 65 rises to 0.390 volts DC, a corresponding current must also flow in the collector-emitter circuit of the associated phase-power transistor 67. This current may typically range from 1 to 3 amps.

It will be appreciated by those skilled in the art that the current control circuitry of the invention is advantageous since current may be rapidly increased in inductances such as the phase windings $\phi 1$–$\phi 4$. In addition, if a phase-winding is accidentally shorted, the controlled current ensures that the associated phase-power transistor will not be harmed. Also, since the current rather than the voltage to the phase-windings of the motor is controlled, the motor may be operated over a wide range of switching speeds without having to switch resistors in series with the phase-windings.

Thus, it should be appreciated that when input timing pulses are applied to change the count state of the program address counter 5, the corresponding data bits at the output of the sine PROM and the cosine PROM are applied to digital-to-analog converter circuitry to cause corresponding controlled currents to flow in particular parts of phase-power transistors and associated windings of the stepping motor.

It should be understood that the output data from the PROMs controls the current that flows, for example, through the phase-power transistors 45 and 67 in accordance with a corresponding swing in the voltage at the associated circuit nodes 53 and 63 from a minimum of zero volts to a maximum of 0.390 volts. It should also be understood that the values of the current sensing resistors 47 and 65 are selected to provide the desired phase-winding driving current with the corresponding voltage at the circuit nodes 53 and 63.

Although the operation of the current control circuitry for the windings $\phi 1$ and $\phi 2$ has been particularly described, it should be appreciated that the current control circuitry for the windings $\phi 3$ and $\phi 4$ operates in the same fashion to apply controlled current to $\phi 3$ and $\phi 4$.

The open collector inverters 71, 73 and 75 operate in the same fashion as the inverter 49 to control the application of controlled current to the corresponding phase-windings $\phi 1$–$\phi 4$. Thus, during the interval in which phase-windings $\phi 1$ and $\phi 2$ are activated, the inverter 49 responds to a high cosine bit HC and the inverter 73 responds to a corresponding high sine bit HS to generate 0.75 volt activation signals to the corresponding operational amplifiers 43 and 61. Of course, when the phase windings $\phi 1$ and $\phi 2$ are activated, the open collector inverters 71 and 75 generate low signals to deactivate the current control circuitry of the phase windings $\phi 3$ and $\phi 4$.

In general, it should be understood that the high order bits of the sine and cosine PROMs control the inverters 49, 71, 73 and 75 to activate appropriate phase drive operational amplifiers over each operational cycle of the program address counter 5. Thus, when the HS bit is high, $\phi 1$ is activated and when the bit is low, $\phi 3$ is activated. Likewise, when the HC bit is high, $\phi 2$ is activated and when the bit is low, $\phi 4$ is activated.

As indicated above, the operational cycle of the program address counter 5 is defined by set/reset circuitry 27. Thus, in the present example, if the motor step is to be divided by a factor of 20, the program address counter 5 will count from zero to 79 and thereafter will reset itself to zero to begin the next successive cycle. In general, for a four-phase motor, a counter and associated memories are required with $4 \times f$ different states or locations, where f is the number by which the primary step is to be divided.

When the counter is incremented to step 79, the eighth bit HS of the sine PROM 7 is high and the eighth bit HC of the cosine PROM 9 is low so that both inputs 77 and 81 of a NAND gate 79 are high, thereby forcing a low signal at the output of the gate. Thereafter, when the input pulse CW is applied to increment the counter 5 to step 80, the seven data bits of the cosine PROM 9 are at a logic high so that the output of NAND gates 83 and 85 are forced low, the output of a NOR gate 87 is forced high, and the output of a NAND gate 89 is forced low. Thus, the inputs 91 and 93 of a NOR gate 95 are low and, as the incrementing input timing pulse CW goes high, a corresponding monostable multivibrator 97 is triggered to generate a low signal at the input 99 of the NOR gate 95. The low signals at the inputs of the gate 95 force the output of the gate high to trigger a monostable multivibrator 101. The activated monostable multivibrator 101 generates a reset pulse that is passed by the NAND gate 29 to reset the counters 31 and 33 to the zero program step and to thereby start the next cycle.

The reset process is repeated at the end of each cycle to set the counters 31 and 33 to begin the next successive cycle. It should be understood that the program step 79 is the last operational step for the circuit of the invention and the momentary program step 80 exists for only a few micro-seconds to allow the counters 31 and 33 to be reset.

If the program address counter 5 is operated in the down-count mode, the output of the NAND gate 89 is applied to provide a corresponding low input to a NOR gate 103 in the above-described manner. However, in this case, a NAND gate 105 is employed to activate the NOR gate 103 at the proper time. In operation, a low is forced at the output of the NAND gate 105 when both $\phi 1$ and $\phi 2$ are activated and corresponding high-order bits HS and HC are high, for example, when the counters 31 and 33 are decremented to the zero state. Since the counters 31 and 33 are operated on the trailing edge of the CCW pulse, the count state is shifted to zero and the inputs 107 and 109 of the gate 103 are forced low and remain low until the next CCW pulse is generated, and passed by the NOR gate 103.

The pulse passed by the NOR gate 103 is applied to trigger a monostable multivibrator 111 and to thereby generate a signal that sets the counters 31 and 33 to a preset code that is present at their respective inputs. In the present example, the preset code corresponds to a count state of 79. Thus, presetting of the counters 31 and 33 initiates the next step cycle for the circuit of the invention.

A wired plug may be applied to define preset information for the counters 31 and 33. Such a plug may be altered to change the number of program steps for the circuit of the invention. Of course, if the number of program steps is changed, the sine and cosine data in the PROMs 7 and 9 must be changed to define data for the corresponding current signals.

Thus, the program address counter 5 and the sine and cosine PROMs 7 and 9 may be altered to define different effective stepping angles for a stepping motor. More particularly, if the appropriate data words are stored in the sine and cosine PROMs and if a cycle of appropriate count length is set for the program address counter 5, the circuit of FIG. 2 will operate to divide a prime motor step by factors of from 2 to 64. However, it should be understood that the invention is not limited to operation within any particular range of step divider factors.

The phase-power transistors 45, 67, 113 and 115 of the circuit of the invention are operated so that appreciable power is dissipated. Thus, the phase-power transistors must be relatively large and their associated heat sinks must also be large to dissipate the appreciable wattage resulting from their operation. In order to reduce the power that is dissipated by the phase-power transistors and to thereby ensure that the circuit of the invention may operate large stepping motors, it is advantageous to normally operate the phase-power transistors at a reduced voltage.

However, a high-speed motor operation requires a relatively high driving voltage due to the inductance of the phase windings. Therefore, it is also desirable to provide an increased voltage to a phase winding to allow the current in the winding to increase at a suitable rate. More particularly, when a phase-power transistor is operated to initially apply an increased current to a particular phase-winding, the inductance of the winding makes it necessary to apply an increased voltage to ensure that the driving current may be increased at the required rate. Thus, the circuit of FIG. 4 is employed to automatically provide a voltage boost to a phase-winding when increased driving current is being applied to the winding. The circuit of FIG. 4 ensures that the voltage across the phase-power transistors is just sufficient to maintain current control, thereby reducing the power dissipation in the associated transistor circuit.

As shown in FIG. 4, operational amplifiers 117, 119, 121 and 123 receive inverter control signals from the phase select circuit 15 and apply the signals to control corresponding NAND gates 125, 127, 129 and 131. The NAND gates 125–131 also receive a signal from a retriggerable one-shot 133. The retriggerable one-shot 133 generates a high enable signal to the gates 125–131 for as long as either the CW or CCW pulses are continuously received.

It will be appreciated that if either the CW or CCW pulses are continuously received, either of the gates 125 or 129 may be activated to apply a low signal to force the output of a NAND gate 135 high and to thereby activate a corresponding high voltage control circuit to apply a high voltage HV to the windings $\phi 1$ and $\phi 3$.

Thus, if the phase windings $\phi 2$ and $\phi 3$ are simultaneously activated, the gate 129 will apply a low logic signal to the input of the gate 135 and the gate 135 will generate a corresponding high signal to the base of a transistor 137, for example 2N3053, to turn on the transistor. Thereafter, the succeeding transistors in the circuit will be operated to apply a high voltage HV to a common connection for the phase windings $\phi 1$ and $\phi 3$. It should be understood that if $\phi 2$ and $\phi 3$ are simultaneously activated, $\phi 1$ will be turned "off" and, therefore, the high voltage HV will only be applied to the phase winding $\phi 3$.

In a similar manner, the NAND gate 125 will activate the NAND gate 135 if phase windings $\phi 4$ and $\phi 1$ are simultaneously activated. Thereafter, the high voltage HV will be applied to the winding $\phi 1$ since $\phi 1$ is, at that time, receiving an increasing driving current.

The NAND gate 127 will activate a NAND gate 139 to cause a high voltage HV to be applied to the common point between phase windings $\phi 2$ and $\phi 4$ if $\phi 1$ and $\phi 2$ are simultaneously activated. Likewise, the NAND gate 131 will cause a high voltage HV to be applied to the phase windings $\phi 2$ and $\phi 4$ if phase windings $\phi 3$ and $\phi 4$ are simultaneously activated.

When either of the NAND gates 135 or 139 is deactivated, the corresponding boost circuit is turned off, and the common point between the associated phase windings is allowed to fall back to a lower voltage LV through one of the switching diodes 141 or 143. Thus, each phase winding receives a boosted voltage only when the phase winding is also receiving an increasing driving current.

Figure 5:
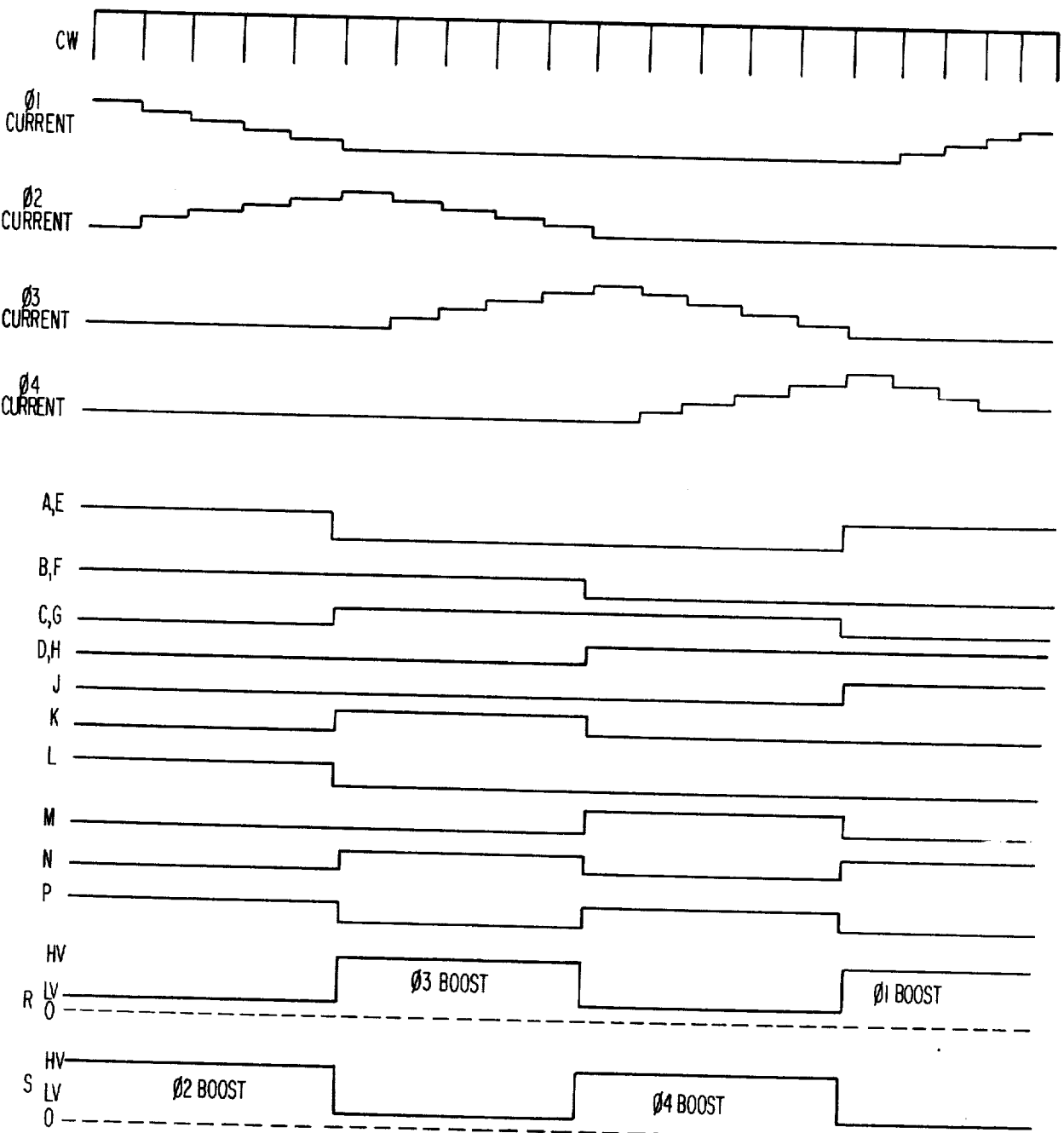
FIG. 5 illustrates the operational signals for the voltage boost circuit of FIG. 4.

FIG. 5 illustrates the operational signals for the voltage boost circuit of FIG. 4. As shown in FIG. 5, the voltage boost for the winding $\phi 1$ is generated when the lines H and E are high, the boost for $\phi 2$ is generated when lines E and F are high, the boost for $\phi 3$ is generated when lines F and G are high, and the boost for $\phi 4$ is generated when lines H and G are high.

Figure 6:
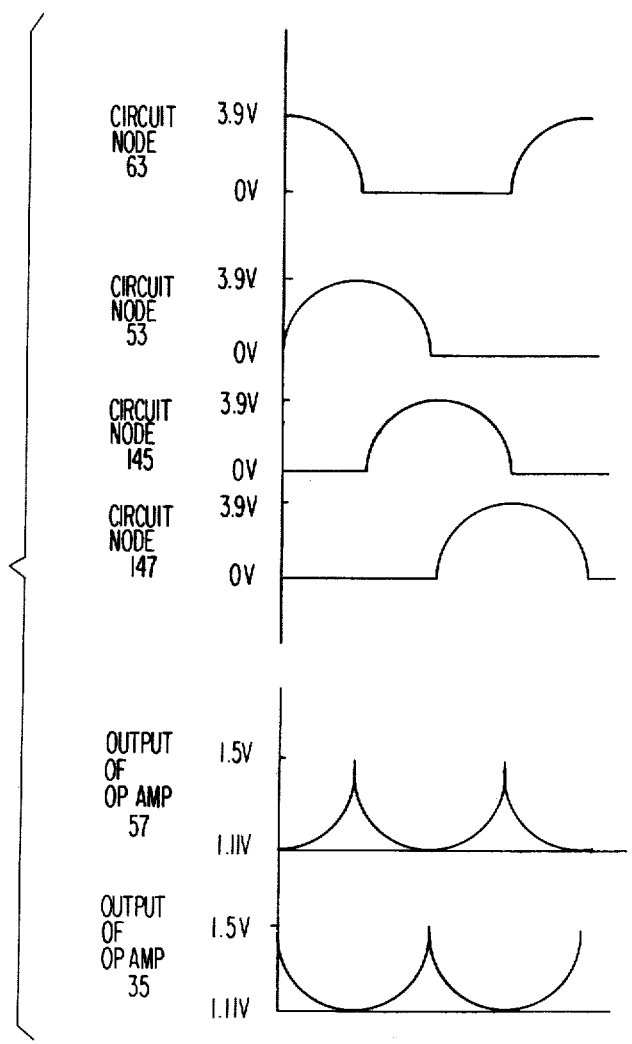
FIG. 6 illustrates operational signals for the prime step divider circuit of FIG. 2.

FIG. 6 illustrates the waveforms that are generated at circuit nodes 53, 63, 145 and 147 of the circuit of FIG. 2. As shown in FIG. 6, the waveforms at the above circuit nodes cover a voltage range of from 0 to 0.390 volts. Also, representative waveforms for the outputs of the operational amplifiers 35 and 57 are shown to illustrate related signals having a voltage swing of from 1.11 volts to 1.5 volts.

Although the circuit of FIG. 2 is shown with particular suggested resistance values and is described with respect to particular voltages, it should be appreciated that the resistance values and operational voltages of the circuit of FIG. 2 may be altered without departing from the spirit of the invention. Also, it should be understood that apparatus according to the invention may be employed to divide the prime step of stepping motors having two or more phase windings so long as the driving currents for the pairs of phase windings overlap in the manner described for the sine and cosine driving current signals.

For example, for a stepping motor having an even number of phases that is greater than four, additional sine and cosine PROM data words will be required to define a step cycle and additional phase select bits may be added to each data word to define additional pairs of active phase windings. Of course, for such motors, additional phase driving circuitry is also required. Similar changes in the circuit of FIG. 2 are necessary for motors having an odd number of phases. However, additional phase select circuitry is required to activate different phase pairs for even and odd step cycles.

Although overlapping sine and cosine current waveforms have been used to ensure a smooth stepping movement, other overlapping current signals may be employed to divide the stepping angle of a stepping motor in accordance with the invention. For example, overlapping sawtoothed waveforms may be used in accordance with the invention.

Furthermore, it should be understood that the timing signals for the program address counter need not be applied periodically, since the step dividing operation of the invention is a function of the number of applied timing signals. Thus, the current signal corresponding to the sine PROM data words has an amplitude, as a function of the number of applied timing signals, that traces a sine waveform and, likewise, the amplitude of the current signal associated with the cosine PROM traces a cosine waveform.

The invention may be embodied in other specific forms without departing from its spirit or essential characteristics. The present embodiments are, therefore, to be considered in all respects as illustrative but not restrictive, the scope of the invention being indicated by the claims rather than by the foregoing description, and all changes which come within the meaning and range of the equivalents of the claims are therefore intended to be embraced therein.

What is claimed is:

1. A step divider apparatus for dividing the primary step of a stepping motor having a plurality of phase windings, comprising:

means for generating input timing signals;

counting means for counting the number of input timing signals from a preset count state;

memory means for storing a plurality of digital words, each digital word defining an incremental current step portion of a non-linear current signal;

means for applying the count state of said counting means to access associated digital words of said memory means;

converter means for generating an analog voltage defined by an accessed digital word;

a driver means for each of said phase windings, each driver means responsive to at least a portion of an accessed digital word for passing a unipolar current that is proportional to the analog voltage associated with the digital word;

phase select means for applying a plurality of sequentially generated analog voltages of said converter means to selected driver means to energize at least one pair of said phase windings, one winding of said at least one pair of windings energized with non-linear current steps defining an increasing non-linear unipolar current signal and the other winding of said at least one pair of windings energized with non-linear current steps defining a decreasing non-linear unipolar current signal;

voltage boost means connected to said phase windings for applying an increased voltage to a phase winding when increasing current is applied to the winding and for applying a reduced voltage to the winding at all other times;

said memory means including a sine programmable memory having stored data words for defining the positive portion of a sine current waveform as a function of the number of input timing signals applied to said counting means and a cosine programmable memory having stored data words for defining the positive portion of a cosine current waveform as a function of the number of input timing signals applied to said counting means;

said motor having four phase windings and including counter reset means for defining a number n of count states of said counting means in an energization cycle for the motor, said number n being equal to the product of a selected step divider factor times four, the step divider factor being the number by which the step divider apparatus divides the primary step of the motor.

* * * * *